United States Patent [19]

Fuchs et al.

[11] 3,937,611

[45] Feb. 10, 1976

[54] PROCESS FOR THE LEVEL DYEING OF WOOL

[75] Inventors: Hermann Fuchs; Hermann-Heinz Konrad, both of Kelkheim, Taunus, Germany

[73] Assignee: Hoechst Aktiengesellschaft, Frankfurt am Main, Germany

[22] Filed: Sept. 6, 1973

[21] Appl. No.: 394,800

[30] Foreign Application Priority Data

Sept. 8, 1972 Germany............................ 2244089

[52] U.S. Cl............................ 8/39 R; 8/17; 8/41 R; 8/54
[51] Int. Cl.².... C09B 1/00; C09B 5/62; D06P 3/14
[58] Field of Search........................... 8/39, 41 B, 54

[56] References Cited
UNITED STATES PATENTS

| | | | |
|---|---|---|---|
| 2,131,121 | 9/1938 | Schlack..................................... | 8/74 |
| 2,817,602 | 12/1957 | Pardo, Jr. ............................ | 117/141 |
| 3,150,916 | 9/1964 | Karacsonyl et al. ...................... | 8/54 |

OTHER PUBLICATIONS

Lewis and Seltzer, J. Soc. Dyers and Colourists, 1972, 88 (3), 93–100.
vonder Eltz, Textilveredlung, 1972, 7 (5), 297–307.
"Fiber-Reactive Dyes" by W. F. Beech, (Logos Press, London, 1970), pp. 243–268.
"Wool—Its Chemistry and Physics" by Alexander and Hudson (Reinhold, New York–1954), p. 324.

Primary Examiner—Joseph L. Schofer
Assistant Examiner—A. L. Clingman
Attorney, Agent, or Firm—Curtis, Morris & Safford

[57] ABSTRACT

Process for the level dyeing of wool, having an antifelting finish consisting of a coating layer of polyimine or polyamine resin, with reactive dyestuffs, which is carried out according to a graduated temperature exhaustion method from an aqueous liquor using one or several reactive dyestuffs of the formulae (I)

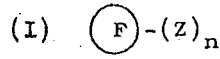

and/or (II)

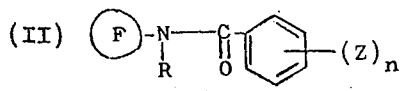

in which F stands for a dyestuff radical having at least 2 sulfonic acid groups linked to an aromatic radical of the chromophore, Z stands for a reactive group of the vinylsulfone, vinylsulfonamide or acrylamide type, $n$ is 1 or 2, and R and $R_1$ each stands for hydrogen atoms or lower alkyl radicals, in the absence of adjuvants and/or without any pretreatment of the material to be dyed.

3 Claims, No Drawings

PROCESS FOR THE LEVEL DYEING OF WOOL

The present invention relates to a process for the level dyeing of wool with reactive dyestuffs.

When dyeing wool, especially woolen material having an anti-felting finish and most especially woolen fibers which have a polyimine or a polyamine coating layer (as it is disclosed in Melliand Textilberichte 9/1971, page 1100 or in Journal of the Society of Dyers and Colourists volume 88, number 3/1972, pages 93–100) preventing them from felting, level dyeing are until now very difficult to obtain. This undesired property is due to the fact that novel groups of the wool having affinity to the dye are activated by the anti-felting finish to effect the salt-like or reactive binding of dyestuff. The higher the affinity of the wool, however, the greater the difficulties to obtain level dyeings on that fibrous material. These difficulties are even increased when combinations of two or more dyestuffs are applied their affinity to the fiber generally being different from one another. Such woolen material having an anti-felting finish can, however, only be dyed with reactive dyestuffs for the sake of fastness because a textile article of that kind stands a repeated washing without felting in household washing machines at 60°C using at the same time perborate-containing detergents and must, therefore, be colour-fast.

Only dyeings prepared by fiber-reactive dyestuffs which are sufficiently fast to wet processing can meet the high requirements necessary to stand several washings at 60°C. Among those dyestuffs just the reactive dyestuffs generally used strongly mark the differences of the affinity depending on the material in the case of polyamide fibers. This disadvantage is especially caused when dyeing with dyes in combinations which show an absorption capacity different from one another on account of their different content of —$SO_3H$ groups in the dyestuff molecule (without considering —$SO_3H$ groups which may be contained in the reactive groups). This phenomenon is especially mentioned in Journal of the Society of Dyers and Colourists, loc. cit., page 96. The usual anti-felting finishes or the treatments of the wool which reduce felting, however, make the differences of affinity depending on the material even greater. Attempts have already been made to master the problem of unlevel reactive dyeings on wool with the preparation of suitable dyestuffs. Experience shows, however, that in this field the dyestuffs can be adapted to the conditions given only to a limited extent because of other dyeing and fastness properties which are required. [cf. Textilveredlung 7, (1972), No. 5, pages 297–307].

The levelling property of a dyestuff or a dyestuff combination is examined by means of a knitted or woven fabric made of yarn dyed in the hank. As soon as this test material shows barriness in the individual knitting rows the dyeing is considered to be unuseful. This examination is carried out in the manner described because wool having an anti-felting finish is especially used for knitting yarns, and the corresponding dyeings must meet these requirements in view of the levelness in the knitting procedure.

It has been found that the disadvantages and difficulties mentioned above which hitherto arose in the dyeing of wool having an antifelting finish consisting of a coating layer of polyimine or of polyamine resin, with reactive dyestuffs can be overcome and that completely level dyeings with reactive dyestuffs can be obtained on these textile materials which dyeings meet the fastness requirements which the articles made thereof must possess, when the dyeings are carried out according to a graduated temperature exhaustion method from an aqueous bath using one or several reactive dyestuffs of the general formulae

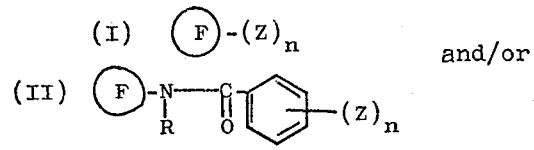

in which F stands for a dyestuff radical of the most various structure, preferably from the azo or anthraquinone series, having at least 2 (generally 2 or 3) sulfonic acid groups linked to aromatic radicals of the chromophore (which do not take part in the reaction with the fiber), Z stands for a reactive group having the constitution indicated hereinafter:

$$-SO_2-CH_2-CH_2-O-SO_3H \quad (1)$$
$$-SO_2-CH_2-CH_2-Cl \quad (2)$$
$$-SO_2-CH=CH_2 \quad (3)$$
$$-SO_2-CH_2-CH_2-\underset{R_1}{N}-CH_2-CH_2-SO_3H \quad (4)$$
$$-\underset{R_1}{N}-SO_2-CH_2-CH_2-\underset{R_1}{N}-CH_2-CH_2-SO_3H \quad (5)$$
$$-\underset{R_1}{N}-SO_2-CH_2-CH_2-O-SO_3H \quad (6)$$
$$-\underset{R_1}{N}-SO_2-CH_2-CH_2-Cl \quad (7)$$
$$-\underset{R_1}{N}-SO_2-CH=CH_2 \quad (8)$$
$$-\underset{R_1}{N}-\underset{O}{\overset{\|}{C}}-CH=CH_2 \quad (9)$$
$$-\underset{R_1}{N}-\underset{O}{\overset{\|}{C}}-CH_2-CH_2-Cl \quad (10)$$
$$-\underset{R_1}{N}-\underset{O}{\overset{\|}{C}}-CBr=CH_2 \quad (11)$$
$$-\underset{R_1}{N}-\underset{O}{\overset{\|}{C}}-CHBr-CH_2Br \quad (12)$$
$$-\underset{R_1}{N}-\underset{O}{\overset{\|}{C}}-CH=CH-\overset{CF}{\underset{}{C}}H-\overset{CF_2}{\underset{}{C}}H-R_1 \quad (13)$$

$n$ is 1 or 2, and R and $R_1$ each stands for a hydrogen atom or low alkyl radicals (preferably methyl or ethyl groups), in the absence of adjuvants and/or without any pre-treatment of the material to be dyed.

As it is disclosed in Journal of the Society of Dyers and Colourists, loc. cit., page 97, the wool having an anti-felting finish is, in principle, washed before carrying out the dyeing operations and then thoroughly rinsed. The following operation steps are important for the levelness of the dyeings obtainable in accordance with the invention and should therefore be observed.

The dyebath is prepared with water of about 40°C with a goods-to-liquor ratio of 1:10 to 1:60, preferably, 1:10 to 1:30 and mixed with the usual chemical substances, such as penetrating adjuvants and those regulating the pH, except the acids required for dyeing, but above all, with the products of the formula I, II or III applied in amounts of from 0.2 to 2%, preferably from 0.5 to 1%, calculated on the weight of the dry wool.

To be completely distributed the liquor is brought for about 10 minutes into contact with the wool to be dyed and having an anti-felting finish. The reactive dyestuffs mentioned above having two or more unreactive sulfonic acid groups in the dyestuff molecule are dissolved with hot water poured over them and added to the dyebath after the period of the pretreatment operation is over. Now, too, the dyeing operation is continued for another 10 minutes at 40°C to distribute the dyestuff equally before the amounts of acid required for dyeing are added to the dyebath. These amounts of acid are adapted to the dyestuff amounts and are used in the following order:

up to 0.3% of dyestuff the pH 6.5 is adjusted with acetic acid
up to 1% of dyestuff the pH 6.3 is adjusted with acetic acid
above 1% of dyestuff the pH 6 is adjusted with acetic acid
above 2.5% of dyestuff the pH 5.5 is adjusted with acetic acid
above 3.5% of dyestuff the pH 5 is adjusted with acetic acid.

After a short period of adjustment the dyebath is heated to 85°C within 45 minutes and maintained at that temperature for 25 to 30 minutes. In the course of this operation the reactive dyestuffs initially undergo with the wool a salt-like addition which is then converted to become a reactive bond progressively while slowly increasing the temperature by about 1° to 2°C per minute. (cf. Textil-Praxis 1971, 3rd edition, pages 164–167). The dyeing is completed at the boiling temperature or at 110°C during 30 to 50 minutes. In the case of dark dyeings, i.e. using about 1% dyestuff and more, the dyeings are generally after-treated in the same bath at elevated pH (about 6.8) in order to assure the fastness properties required for the dyed woolen material to stand a treatment in the washing machine at 60°C. For this purpose, an alkali-yielding agent, preferably sodium trichloroacetate is introduced into the bath, in accordance with the invention, in amounts capable of changing the pH of the liquor during the after-treatment gradually from the acid in direction to the neutral range.

According to the invention the dyeing of the wool having an anti-felting finish can be performed in any processing stade on suitable dyeing machines, for example, exhaustion dyeing apparatus, winch vat, paddle dyeing machine and others. The material is present in the form of combed material, yarn, woven and knitted fabric, finished pullover or finished pullover parts or of piece goods.

Even fast running dyeing machines, for example, the yarn dyeing machine of the System of Bellmann, allow to dye very sensitive shades, by means of the dyestuffs indicated above when changing the process in corresponding manner which is necessary because of the high liquor through-put in the machine. Under these conditions useful dyeings could not be obtained until now.

It was also surprising that the dyestuffs having the structure described above could be applied in completely level manner to wool, having an anti-felting finish, which could not be expected considering the experiences made until now (cf. Journal of the Society of Dyers and Colourists, loc. cit., page 96).

Dyestuffs of the type used according to this invention are described in Colour Index, 3rd Edit., Vol. 3 under the designation "Reactive Dyes". The following examples illustrate the invention:

EXAMPLE 1

Finished pullover parts made of wool, having an anti-felting finish, were dyed on a paddle-dyeing machine with a goods-to-liquor ratio of 1:20. The anti-felting finish of the wool was effected according to the process described in Melliand Textilberichte 9/1971, page 1100 and in Journal of the Society of Dyers and Colourists, volume 88, page 93 et seq.

To dye the textile material the dyebath was prepared at 40°C and the aqueous liquor was mixed with the following products (in % each calculated on the dry weight of the wool):

0.74% of the reaction product of 1 mol of stearyl amine with 10 mols of ethylene oxide,
0.26% of dodecylsulfonic acid
2.0% of ammonium acetate The liquor so prepared was allowed to contact with the material to be dyed during 10 minutes at 40°C and 0.9% of the reactive dyestuff of the formula

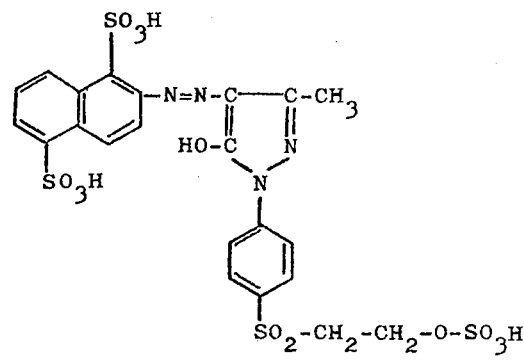

in the commercial form adjusted with methyl taurine and dissolved in hot water were added to this liquor. After a further 10 minutes the dyebath was adjusted to pH 6.3 with aceti acid and heated from 40° to 85°C within 45 minutes. The material was dyed at 85°C during 25 minutes, then the liquor was brought to the boiling point by raising the temperature by 1° to 2°C per minute and dyeing was continued for a further 60 minutes under these conditions. Within this boiling period 2.5% of sodium trichloroacetate were added to the dyebath, 40 minutes after boiling began to improve the fastness properties of the dyeing. Finally, the material dyed was rinsed gradually with hot and cold water. A very level and fast yellow dyeing was obtained.

When dyeing under the same dyeing conditions with the dyestuff of the formula

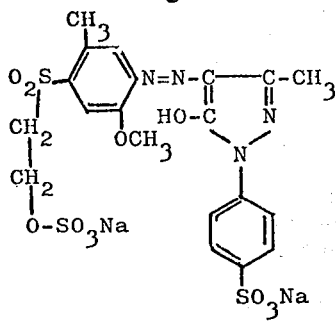

an unlevel unuseable dyeing was obtained.

EXAMPLE 2

Woolen knitting yarn, having an anti-felting finish, was dyed on a hank dyeing machine of the System of Bellmann with a goods-to-liquor ratio of 1:60.

The bath was prepared with water of 70°C, to which the following products (in % calculated on the dry weight of the wool) were added:
0.74% of the reaction product of 1 mol of stearyl amine with 10 mols of ethylene oxide,
0.26% of dodecylsulfonic acid,
2.0% of ammonium acetate
and it was adjusted to pH 6.5 with acetic acid. The liquor so prepared was allowed to contact the material to be dyed at 70°C for 2 minutes to which 0.2% of the reactive dyestuff of the formula

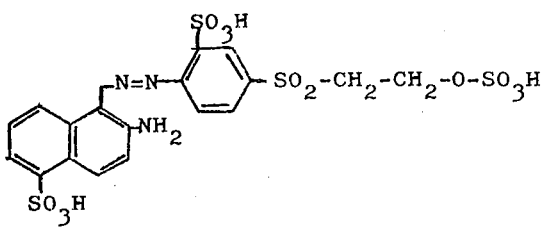

in commercial form adjusted with methyl taurine and dissolved in hot water were added. After a further 2 minutes of contact of the goods with the liquor, the dyebath was heated to 110°C during about 10 minutes and the material was dyed at that temperature during 10 minutes. The dyebath was then rapidly cooled (within about 5 minutes) to 90°C, the dyed fibrous material was removed from the dyeing apparatus to be rinsed. The dyeing was rinsed gradually with hot and cold water. A very level fair blue dyeing was obtained.

A dyeing produced under the same conditions using 0.2% of the reactive dyestuff of the formula

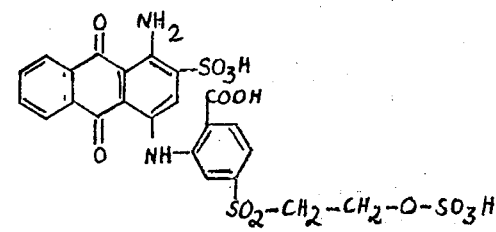

could absolutely not be used for knitting because it was not level.

EXAMPLE 3

Knitted fabric in pieces made of wool, having an anti-felting finish, were dyed on a winch vat with a goods-to-liquor ratio of 1:30.

The dyebath was prepared with water of 40°C, to which the following products (in % calculated on the dry weight of the wool) were added:
0.74% of the reaction product of 1 mol of stearyl amine with 10 mols of ethylene oxide,
0.26% of dodecylsulfonic acid,
2.0% of ammonium acetate
and the material was dyed in that liquor. After a period of 10 minutes of pretreatment at 40°C, 2% of the reactive dyestuff of the formula

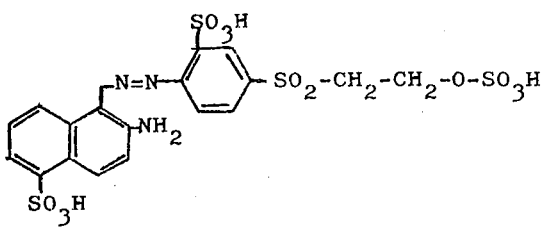

and 0.5% of the reactive dyestuff of the formula

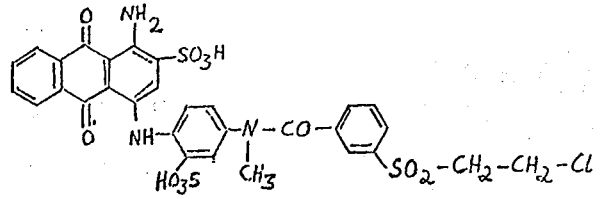

in commercial form adjusted with methyl taurine and dissolved in hot water were added to the bath and the dyeing operation was continued for another 10 minutes. The pH of the bath was adjusted to 1 to 6 with acetic acid, then the temperature of the dyeing liquor was raised to 85°C within 45 minutes and the material was dyed at 85°C for 25 minutes. The liquor was brought to the boil by raising the temperature by 1° to 2°C per minute and dyeing was continued for another 70 minutes under these conditions whereafter 2.5% of sodium trichloroacetate were added to the bath after a boiling period of 50 minutes to improve the fastness properties of the dyeing. Finally the dyed material was rinsed gradually with hot and cold water. A very level, fast red dyeing was obtained.

When dyeing the wool, having an anti-felting finish, according to the same procedure, for example with 2% of the reactive dyestuff of the formula

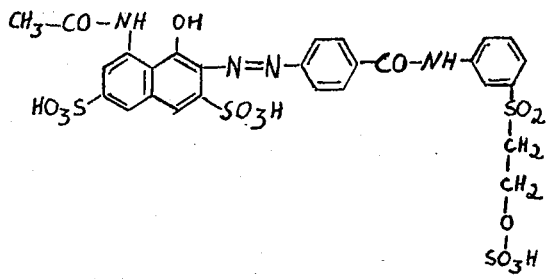

and 0.5% of the reactive dyestuff of the formula

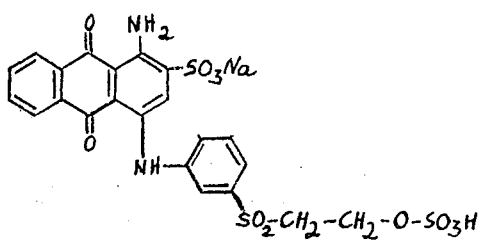

unlevel, unuseable dyeings were obtained.

EXAMPLE 4

Combed material of wool, having an anti-felting finish was dyed on the dyeing apparatus with a goods-to-liquor ratio of 1:12. The bath was prepared as in Example 1 to which 3% of the reactive dyestuff of the formula

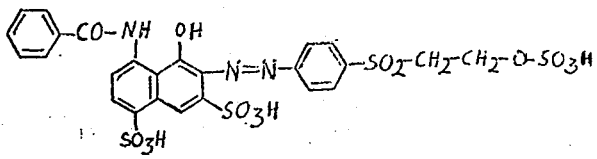

and 1% of the reactive dyestuff of the formula

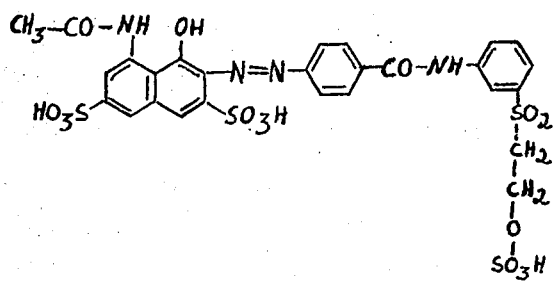

in commercial form, adjusted with methyl taurine and acidified to pH 5 with acetic acid were added while maintaining the same course of operation. The following procedure with the after-treatment are analogous to that of Example 1, however, the dyeing temperature of the liquor is brought to 106°C (instead of the boiling temperature). A very level red dyeing having very good fastness properties was obtained on the wool.

We claim:

1. A process for the level dyeing of wool, having an anti-felting finish consisting of a coating layer of polyimine or polyamine resin, with reactive dyestuffs, which process comprises carrying out the dyeing according to a graduated temperature exhaustion method from an aqueous liquor using one or several reactive dyestuffs of the formulae (I)  $\boxed{F}-(Z)_n$ and/or (II)  $\boxed{F}-\underset{R}{N}-\underset{O}{\overset{\|}{C}}-\boxed{\phantom{x}}-(Z)_n$ in which F stands for an azo or anthraquinone dyestuff radical having at least 2 sulfonic acid groups linked to an aromatic radical of the chromophore, Z stands for a reactive group of the following constitution:

$-SO_2-CH_2-CH_2O-SO_3H$     (1)
$-SO_2-CH_2-CH_2-Cl$     (2)
$-SO_2-CH=CH_2$     (3)
$-SO_2-CH_2-CH_2-\underset{R_1}{N}-CH_2-CH_2-SO_3H$     (4)
$-\underset{R_1}{N}-SO_2-CH_2-CH_2-\underset{R_1}{N}-CH_2-CH_2-SO_3H$     (5)
$-\underset{R_1}{N}-SO_2-CH_2-CH_2-O-SO_3H$     (6)
$-\underset{R_1}{N}-SO_2-CH_2-CH_2-Cl$     (7)
$-\underset{R_1}{N}-SO_2-CH=CH_2$     (8)
$-\underset{R_1}{N}-\underset{O}{\overset{\|}{C}}-CH=CH_2$     (9)
$-\underset{R_1}{N}-\underset{O}{\overset{\|}{C}}-CH_2-CH_2-Cl$     (10)
$-\underset{R_1}{N}-\underset{O}{\overset{\|}{C}}-CBr=CH_2$     (11)
$-\underset{R_1}{N}-\underset{O}{\overset{\|}{C}}-CHBr-CH_2Br$     (12)
$-\underset{R_1}{N}-\underset{O}{\overset{\|}{C}}-CH=CH-\overset{CF_2}{\underset{}{CH}}-\overset{CF_2}{\underset{}{CH}}-R_1$     (13)

  (14)

  (15)

n is 1 or 2, and R and $R_1$ each stands for hydrogen atoms or lower alkyl radicals, in the absence of adjuvants and/or without any pretreatment of the material to be dyed.

2. A process as claimed in claim 1, wherein an alkali-yielding agent is allowed to act on the dyeings in the same bath in amounts capable of changing the pH of the liquor gradually from the acid in direction to the neutral range during the after-treatment operation.

3. A process as claimed in claim 2, wherein the alkali-yielding agent is sodium trichloroacetate.

* * * * *